Oct. 23, 1928.

H. L. BOLINGER

TRAP NEST

Filed June 16, 1927

1,688,779

Harvey L. Bolinger, Inventor

By C. A. Snow & Co.

Attorneys

Patented Oct. 23, 1928.

1,688,779

UNITED STATES PATENT OFFICE.

HARVEY L. BOLINGER, OF MOUNTAIN GROVE, MISSOURI, ASSIGNOR OF ONE-HALF TO T. W. NOLAND, OF MOUNTAIN GROVE, MISSOURI.

TRAP NEST.

Application filed June 16, 1927. Serial No. 199,308.

This invention relates to a trap nest for trapping all kinds of poultry such as chickens, ducks, geese and turkeys and also for trapping pigeons, etc.

One of the objects of the invention is to provide a drop door having a novel form of trigger for supporting the same in open position, said trigger being shifted by the fowl entering the nest so as to release the door readily and permit it to gravitate to closed position.

A further object is to provide a trigger so constructed and mounted as to permit a fowl to leave the nest when the door is open without releasing the door.

A still further object is to provide a trigger which will be set automatically when the door is opened, thereby to support the door until the trigger is released by a fowl entering the nest.

A further object is to provide a trigger which will be supported close to the door and out of the way when the door is closed, so as not to interfere with the fowl in the nest.

A still further object is to provide a trigger which can be adjusted to support the door at different elevations, thereby to adapt the mechanism for use with nests of different sizes.

With the foregoing and other objects in view which will appear as the description proceeds the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings.

Figure 1:
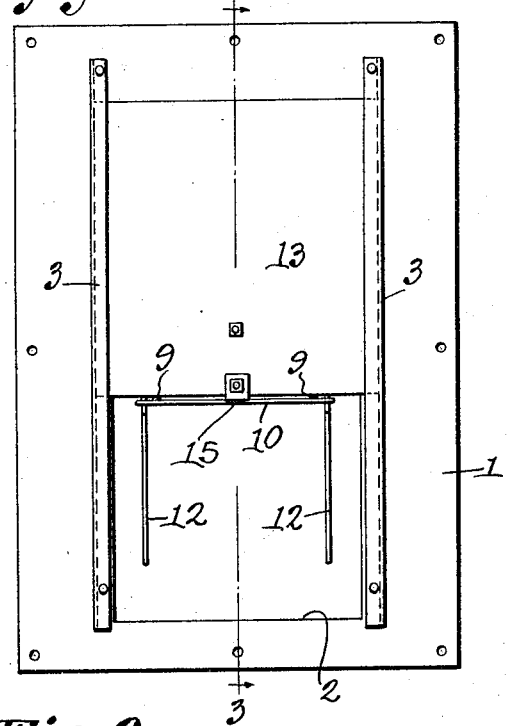
Figure 1 is a front elevation of a trap nest having the present improvements combined therewith, the door being shown supported in open position by the trigger.
Figure 2:
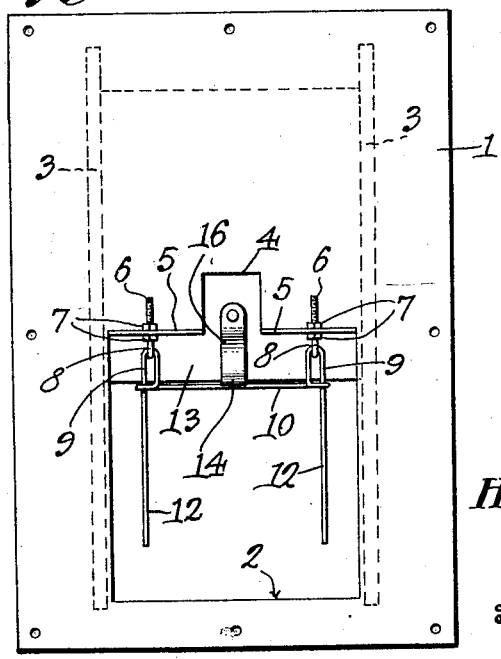
Figure 2 is a rear elevation of the structure shown in Figure 1.

Referring to the figures by characters of reference 1 designates the front wall of the nest provided with a door opening 2 and at the sides of this opening are located guides 3 for a door, these guides being of any preferred construction. For example they can be in the form of longitudinally channeled cleats as shown. Obviously other forms of guides can be used where found more desirable.

The top wall of the door opening has a central recess 4 extending upwardly thereinto and projecting inwardly from said wall of the door opening at opposite sides of the recess 4 are flanges 5. These flanges are engaged by supporting bolts 6 slidable therethrough and adapted to be held at any desired elevation by nuts 7 clamping against opposed faces of the flanges. Eyes 8 are provided at the lower ends of the bolts and constitute bearings for spaced loops 9 depending from the eyes and connected at their lower ends by a cross rod 10. An arm 11 is extended substantially at right angles from the lower portion of each loop 9 and merges, at one end into an elongated depending finger 12. The two fingers thus provided are so shaped as to hang normally within the opening 2 at opposite sides of the center thereof where they will be engaged by a fowl entering or leaving the nest through the opening. These fingers 12, with the arms 11, cross rods 10 and loops 9 constitute the trigger employed for controlling the operation of the door of the nest.

The nest door has been indicated at 13 and is mounted to slide within the guides 3. This door can be of any preferred construction. In the structure illustrated it is made of sheet metal but it is to be understood that, if preferred, it can be made of wood and can be made of one or more pieces fixedly or movably connected. To the inner face of the door at the lower end thereof is attached a lug 14 formed preferably of a strip of metal the lower end portion of which is extended inwardly at right angles to the inner face of the door 13 as shown at 15 while the upper end portion of the lug is inclined upwardly toward the door from the inner end of the lower portion 15. This lug may be attached to the door by any suitable means.

Figure 3:
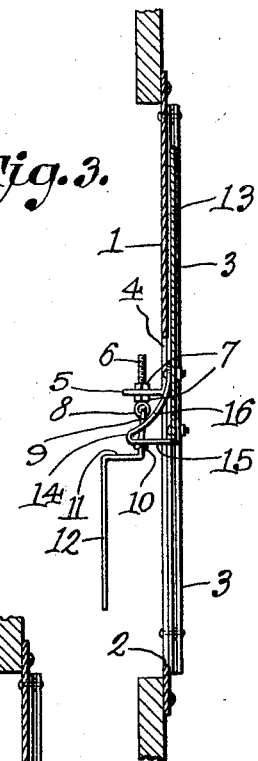
Figure 3 is a section on line 3—3, Figure 1.
Figure 4:
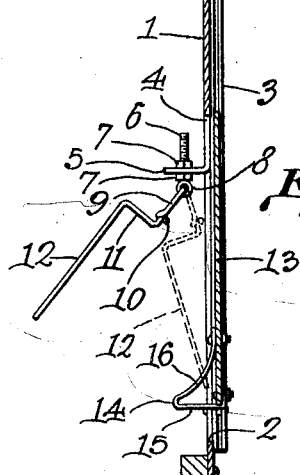
Figure 4 is a similar view showing the door closed and the trigger pressed inwardly away from normal position, the normal location of the trigger being indicated by broken lines.

When the door 13 is in its lowermost or closed position the lower ends of the fingers 12 bear outwardly against the lower portion of the door as shown by broken lines in Figure 4 and the cross rod 10 is supported in the path of the lug 14. When it is desired to release a trapped fowl, a person outside the nest raises the door so that the upper inclined portion 16 of the lug 14 will come against the rod 10 and shift the trigger inwardly substantially to the position shown by full lines in Figure 4. As soon as the lug passes to a point above the rod 10, the trigger will swing outwardly substantially to the position shown in Figure 3 where the rod 10 will be brought under the portion 15 of the lug and provide a support therefor. Consequently the door will be held in raised position. The fowl can then be removed from the nest, it merely being necessary to reach through the opening 2 and between fingers 12 to grasp a fowl and withdraw it. Or, if preferred, the fowl can be permitted to leave of its own accord. In either case when the fowl comes against the depending fingers 12 they will be swung into the opening 2 and then outwardly and upwardly under the door, slightly elevating the door so as to allow the fowl to leave readily. The door, however, will remain elevated because, as soon as the fowl has passed away from the fingers 12, they will swing back to normal position with the rod 10 under the lug 14. With the door open it will be noted that when a fowl enters the nest it will come against the fingers 12 and thrust them inwardly. Consequently the trigger will be shifted substantially to the position shown by full lines in Figure 4, thereby withdrawing the rod from under the lug and releasing the door 13. The door will drop by gravity to closed position and as soon as the fingers 12 have become disengaged from the fowl they will gravitate back against the inner face of the door as shown by broken lines in Figure 4.

By providing the bolts 6, it becomes possible to adjust the trigger upwardly or downwardly relative to the walls of the opening 2 so as to support the door, when open, at any desired elevation. The recess 4 in the front wall of the nest is utilized to receive the lug 14 when the door is in its full open position.

It is to be understood of course that means other than those shown may be employed for adjustably supporting the trigger and, obviously, instead of connecting the trigger directly to the wall as illustrated, it can be carried by a separate piece to be attached to the wall of the nest. Such a construction is so obvious that specific illustration thereof is not deemed essential.

What is claimed is:

The combination with the wall of a trap nest having a door opening, and a sliding door, of a lug extending inwardly from the door having a lower support engaging face and an upper deflecting face, adjustable bearing members connected to the wall, and a trigger suspended from said bearing member and mounted to swing toward and from the door opening, said trigger including means for engagement with the bearing members, a rod connecting said means and normally positioned in the path of the lug to be deflected inwardly thereby when the door is raised and to be engaged by the lug to support the door when open, and offset depending fingers connected to said means.

In testimony that I claim the foregoing as my own, I have hereto affixed my signature.

HARVEY L. BOLINGER.